United States Patent [19]

Aritsuka et al.

[11] Patent Number: 5,438,253

[45] Date of Patent: Aug. 1, 1995

[54] STATIC VAR GENERATOR USING SELF-COMMUTATED INVERTER

[75] Inventors: Tomohiko Aritsuka; Michihiro Furuta, both of Hyogo, Japan

[73] Assignee: Mitsubishi Denki Kabushiki Kaisha, Tokyo, Japan

[21] Appl. No.: 162,301

[22] Filed: Dec. 6, 1993

[30] Foreign Application Priority Data

Dec. 7, 1992 [JP] Japan .................................. 4-326468

[51] Int. Cl.$^6$ .............................................. G05F 1/70
[52] U.S. Cl. ...................................... 323/207; 363/39
[58] Field of Search .................. 323/205, 207; 363/34, 363/37, 39, 40; 364/492

[56] References Cited

U.S. PATENT DOCUMENTS

| | | | |
|---|---|---|---|
| 4,602,206 | 7/1986 | Walker | 323/207 |
| 4,651,265 | 3/1987 | Stacey et al. | 363/35 |
| 4,994,981 | 2/1991 | Walker et al. | 323/207 |
| 5,047,909 | 9/1991 | Hosoda | 323/207 |
| 5,051,683 | 9/1991 | Hirose et al. | 323/207 |
| 5,162,983 | 11/1992 | Kumagai | 363/39 |
| 5,329,221 | 7/1994 | Schauder | 323/207 |

OTHER PUBLICATIONS

"Development and Real System Driving Test of SVG (Static Var Generator)"; Harumoto et al.; Mitsubishi Denki Technical Report; vol. 56, No. 6, 1982, pp. 47–52.

*Primary Examiner*—Thomas M. Dougherty
*Assistant Examiner*—Matthew V. Nguyen
*Attorney, Agent, or Firm*—Leydig, Voit & Mayer

[57] ABSTRACT

A static var generator using self-commutated inverter being able to resume its operation securely and smoothly immediately after a system grounding accident disappears and whose system can be stabilized securely after the accident is provided. The static var generator using self-commutated inverter of the present invention is provided with an accident-detecting circuit 21 comprising band pass filters 22a and 22b extracting the second harmonic components contained in active voltage feedback signals $V_P-$ and reactive voltage feedback signals $V_Q-$, comparators 23a and 23b comparing these output signals and a prescribed set value and judging of the occurrence of an accident, and an OR circuit 24 operating logical sums of these both output signals. Further, the static type power generator of the present invention comprises a reactive current reference zero controlling circuit 20 controlling a reactive current reference signal $I_Q^*$ to be zero according to the detected outputs of the accident-detecting circuit 21, and a soft starting circuit restricting return speeds of the reactive current reference signal at the time of the release of the reactive current reference zero control.

4 Claims, 7 Drawing Sheets

STATIC VAR GENERATOR USING SELF-COMMUTATED INVERTER

BACKGROUND OF THE INVENTION

1. Field of the Invention

The present invention relates to a static type reactive power generator for adjusting the reactive power of an alternating current system.

2. Description of the Prior Art

Figure 1:
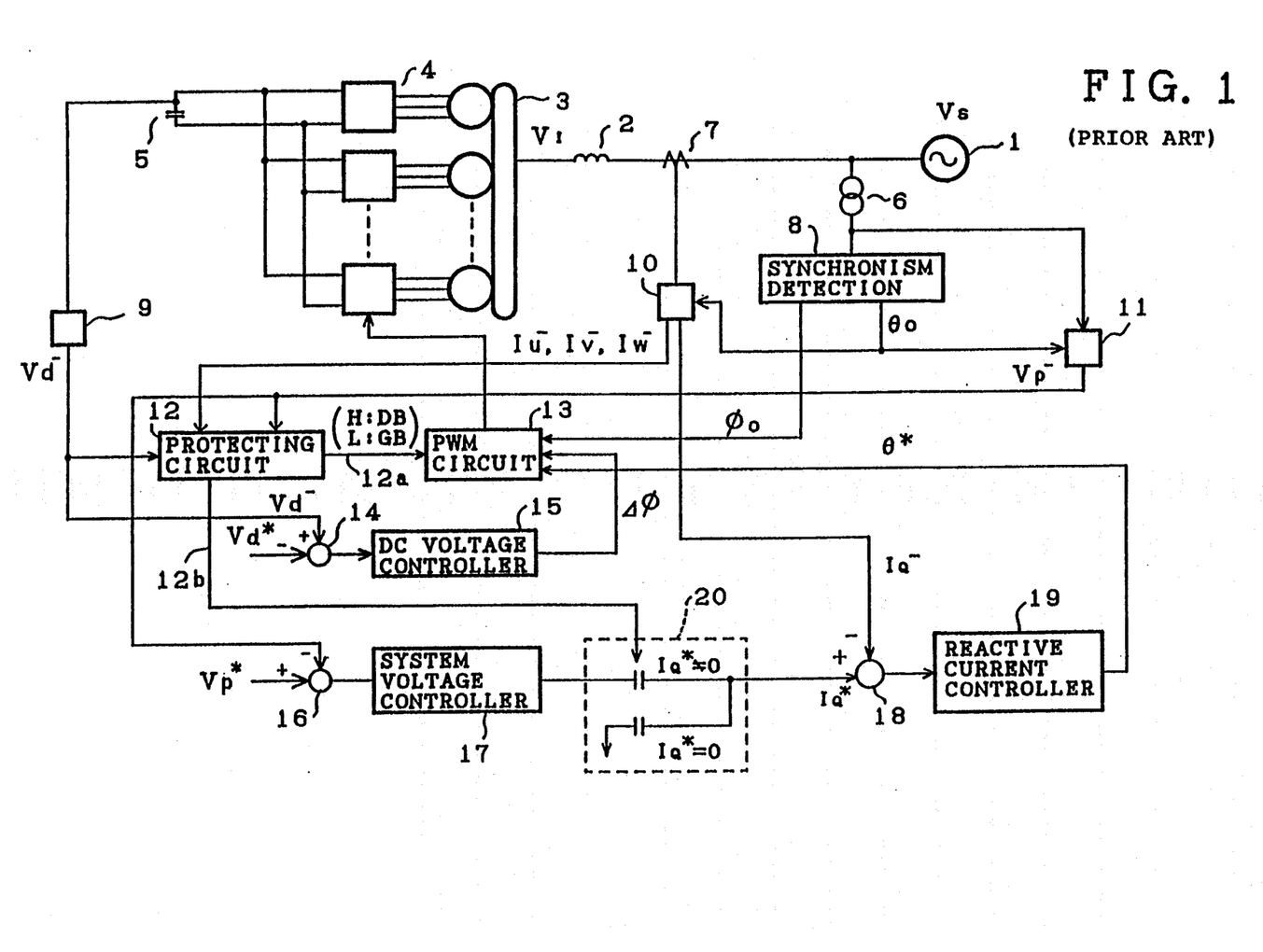
FIG. 1 is a circuit diagram showing a prior art SVG.

FIG. 1 is a circuit diagram of a prior art static var generator using self-commutated inverter (hereinafter denoted by SVG) of this kind shown in, for example, "MITSUBISHI DENKI GIHO", Vol. 56, No. 6, 1982, pp. 47-52. In FIG. 1, reference numeral 1 designates a three-phase alternating current system (power system), and reference numeral 2 designates a reactor. Reference numeral 3 designates a multiple transformer, and reference numeral 4 designates pulse width modulation (hereinafter denoted by PWM) controlling system single-phase inverter connected in multistage. Reference numeral 5 designates a power capacitor as a d.c. power source.

Reference numeral 6 designates a potential transformer (hereinafter denoted by PT) for detecting each phase system voltage of the alternating current system 1. Reference numeral 7 designates a current transformer (hereinafter denoted by CT) for detecting each phase system current or current flowing in each phase reactor 2. Reference numeral 8 designates a synchronism detection circuit for detecting a phase reference $\phi_O$ for the PWM and a phase angle $\theta_O$. Reference numeral 9 designates a d.c. voltage detector for detecting the d.c. voltage of the power capacitor 5 and outputting it as a d.c. voltage feedback signal $Vd^-$. Reference numeral 10 designates a current detector as a current detecting means for outputting system phase current signals $I_U^-$, $I_V^-$ and $I_W^-$ detected by the CT 7 and a reactive current feedback signal deduced by executing a d-q transformation from these phase current signals and the above mentioned phase angle $\theta_O$. Reference numeral 11 designates a voltage detector as a voltage detecting means for outputting an active voltage feedback signal $Vp^-$ deduced by executing the d-q transformation from each phase system voltage signal detected by the PT 6 and the phase angle $\theta_O$.

Reference numeral 12 designates a protecting circuit for detecting abnormal phenomena produced by grounding accidents of the alternating current system from the d.c. voltage feedback signal $Vd^-$, the system phase current signals $I_U^-$, $I_V^-$ and $I_W^-$ and the active voltage feedback signal $Vp^-$, and the protecting circuit 12 generates a gate block (hereinafter denoted by GB) signal. Reference numeral 13 designates a PWM circuit for controlling gate signals of the signal-phase inverter 4. Reference numeral 14 designates a signal adder for operating the deviation between the d.c. voltage feedback signal $Vd^-$ and a d.c. voltage reference signal $Vd^*$. Reference numeral 15 designates a d.c. voltage controller generating a phase difference reference signal $\Delta\phi$ for d.c. voltage control from the output signal of the signal adder 14, and the d.c. voltage controller 15 is composed of proportional integrating elements.

Reference numeral 16 designates a signal adder for operating the deviation between the active voltage feedback signal $Vp^-$ and an active voltage reference signal $Vp^*$. Reference numeral 17 designates a system voltage controller generating a reactive current reference signal $I_Q^*$ for system voltage controlling from the output signal of the signal adder 16, and the system voltage controller 17 is composed of proportional integrating elements and the like. Reference numeral 18 designates a signal adder for operating the deviation between the reactive current feedback signal $I_Q^-$ and the reactive current reference signal $I_Q^*$. Reference numeral 19 designates a reactive current controller for generating a conduction angle reference signal $\theta^*$ for the reactive current control of the output signal from the signal adder 18, and the reactive current controller 19 is composed of proportional elements. Reference numeral 20 designates a reactive current reference zero controlling circuit for controlling the reactive current reference signal $I_Q^*$ to zero over a prescribed period of time on the signal from the protecting circuit 12.

Next, the operation of the prior art SVG will be described. At first, the basic principle of the SVG will be described.

If the magnitude, frequency and phase of the output voltage of the SVG (the output voltage is the synthesized one from the output voltages of each single-phase inverter 4 by the multiple transformer 3) are synchronized with those of the power system voltage, the inflow current from the alternating current system (i.e. power system) 1 to the SVG is zero. However, if the output voltage of the SVG is controlled to be higher than the system voltage, an advanced phase current is flowed into the SVG. In opposition, if the output voltage of the SVG is made to be lower than the system voltage, a lagging current is flowed into the SVG.

The controlling of the reactive power can be done by controlling the output voltage of the SVG. And, there are two controlling methods for controlling the output voltage in general, one of them is the PAM method where the output voltage of an inverter is controlled by adjusting variably the d.c. voltage of a capacitor under the condition that the conduction angle $\theta$ of the inverter is constant, and the other of them is the PWM method where the output voltage of an inverter is controlled by adjusting variably the conduction angle $\theta$ of the inverter under the condition that the d.c. voltage of a capacitor is constant. FIG. 1 designates the latter PWM method. Besides, the d.c. voltage is controlled by the phase difference between those of the system voltage and the output voltage of the SVG, and the output voltage of the SVG is controlled by the conduction angle $\theta$ of the inverter.

Now, the output voltage of the inverter is represented with the following expression.

$$V_{01} = 4/(\sqrt{2} \times \pi) \times Ed \times \sin(\theta/2)$$

$\theta$: conduction angle of inverter
Ed: d.c. voltage
$V_{Or}$: fundamental effective value of inverter output voltage Besides, the d.c. voltage is controlled by the phase difference reference signal $\Delta\phi$ calculated from the constant d.c. voltage reference signal $Vd$ and the d.c. voltage feedback signal $Vd^-$ by the d.c. voltage controller 15.

Figure 2:
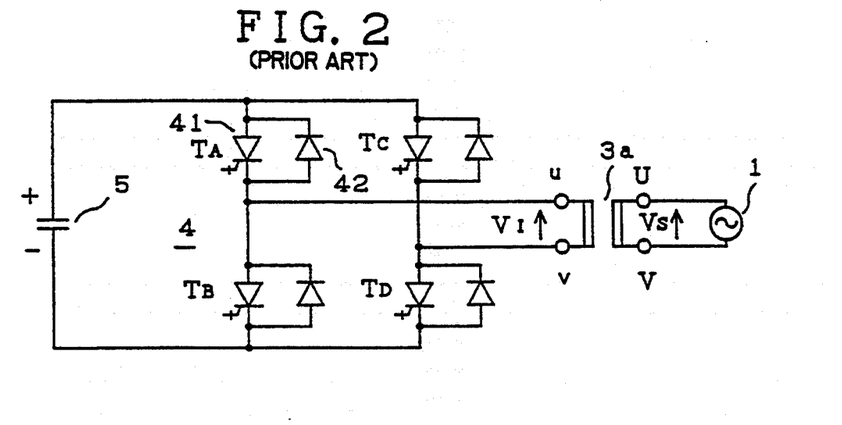
FIG. 2 is a circuit diagram showing a single-phase inverter apparatus for explaining the basic principle of a SVG.
Figure 3A:
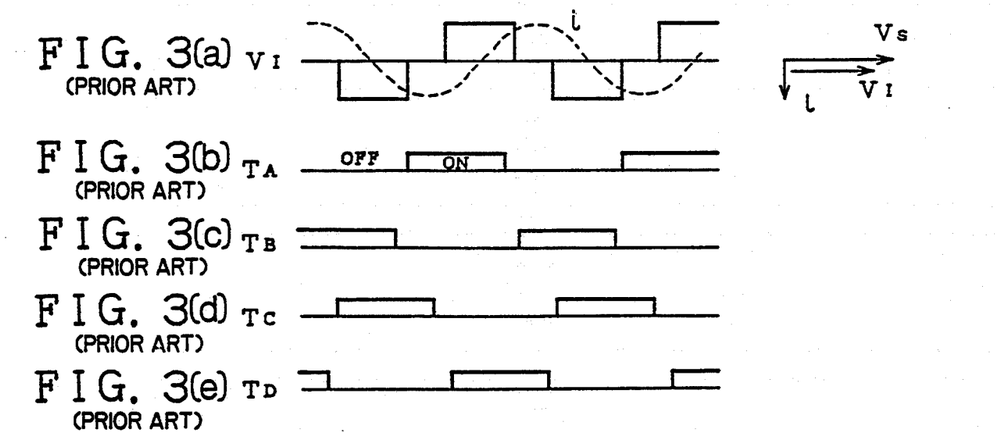
Figure 4A:
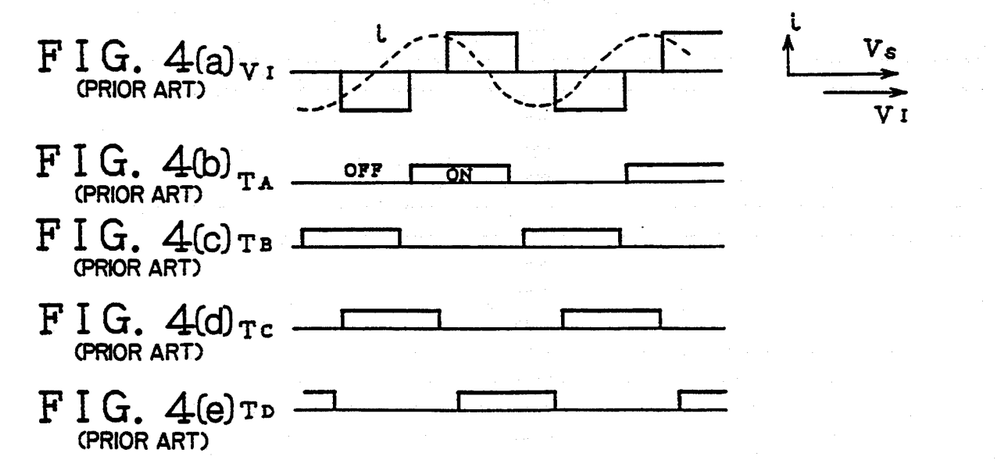

FIG. 2-FIG. 4 simply shows the operation of the basic principle described above using a single-phase circuit. That is, in FIG. 2, the single-phase inverter 4 is composed of gate turn-off thyristors (hereinafter denoted by GTO thyristors) 41 connected in a single phase bridge connection to each other and diodes 42 connected to the GTO thyristors 41 in reversely parallel connections, and the output voltage $V_I$ of the inverter 4 is inputted to the primary winding side of a single-phase transformer 3a, and further the secondary winding side of the transformer 3a is connected to the alternating system 1 having a voltage $V_S$.

FIG. 3a–e show the output voltage and current waveforms of the single-phase inverter 4 and the conduction states of each arm device $T_A$, $T_B$, $T_C$ and $T_D$, respectively, when a lagging current is outputted by making the voltage $V_S$ and the output voltage $V_I$ to be $V_S > V_I$.

And, FIG. 4a–e show the output voltage and current waveforms of the single-phase inverter 4 and the conduction states of each arm device $T_A$, $T_B$, $T_C$ and $T_D$, respectively when an advanced phase current is outputted by making the voltage $V_S$ and the output voltage $V_I$ to be $V_S < V_I$.

In the SVG shown in FIG. 1, the system voltage controller 17 calculates the reactive current reference signal $I_Q^*$ on the active voltage feedback signal $V_P^-$ detected by the voltage detector 11 and the active voltage reference signal $V_P^*$. Then, the reactive current controller 19 calculates the conduction angle reference signal $\theta^*$ on the reactive current reference signal $I_Q^*$ and the reactive current feedback signal $I_Q^-$ detected by the current detector 10, and the reactive current controller 19 sends the conduction angle reference signal $\theta^*$ to the PWM circuit 13. Since the phase reference $\phi_0$ from the synchronism detection circuit 8 and the phase difference reference signal $\Delta\phi$ from the d.c. voltage controller 15 are inputted separately to the PWM circuit 13, the PWM circuit 13 decides the gate pulses of each single-phase inverter 4 on these signals and sends the gate pulses to each single-phase inverter 4. The multiple transformer 3 synthesizes the output voltages of each single-phase inverter 4 and generates the output voltage $V_I$ as that of the SVG. The reactive power is generated from the difference voltage between this output voltage $V_I$ and the system voltage $V_S$ through the reactor 2, as described about the above mentioned principle.

Figure 5:
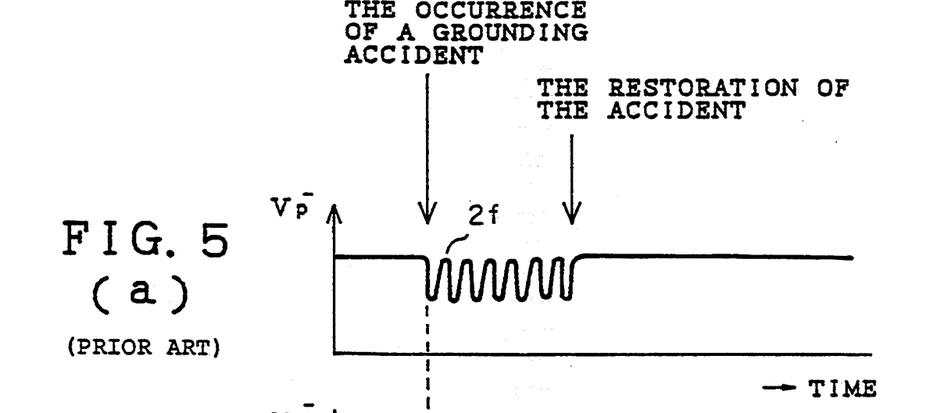
FIG. 5(a)–FIG. 5(e) are timing charts showing the protection operation of the prior art static type power generator.

Next, the operation in case of the accident of the alternating system especially aimed in the present invention will be described in FIG. 5(a)–FIG. 5(e). FIG. 5(a)–FIG. 5(e) show the operation waveforms of each signal in case of the occurrence of a one-line or a two-line grounding accident in the alternating system 1. FIG. 5(a) shows the waveform of the active voltage feedback signal $V_P^-$. The oscillatory waveform of the second harmonic (2f) component of the frequency (f) of the alternating system 1 appears during the period of the occurrence of the grounding accident, as will be described later.

FIG. 5(b) shows the d.c. voltage feedback signal $V_d^-$. It falls greatly at the occurrence of the grounding accident, but it recovers immediately because the protecting circuit 12 operates to execute the gate block (GB) of the single-phase inverter 4 (refer to FIG. 5(e)). FIG. 5(c) shows the system current $I_U^-$. It rises to the overcurrent region by the grounding accident, but it falls to zero by the GB operation mentioned above after that.

FIG. 5(d) shows the the operation waveform of the reactive current feedback signal $I_Q^-$. Since the protecting circuit 12 operates at the occurrence of the grounding accident to generate the GB (gate block) signal of the "L" potential level in place of the DB (de-block) signal of the "H" potential level generated up to that time and the reactive current reference zero controlling circuit 20 controls the reactive current reference signal $I_Q^*$ to be zero, the operation waveform corresponds to this operation.

FIG. 5(e) shows the waveform of the GB/DB signal 12a generated by the protecting circuit 12. The signal 12a becomes the GB signal of the "L" potential level at the same time as the occurrence of the accident to execute the gate block of the single-phase inverter 4 and to control the the reactive current reference signal $I_Q^*$ to be zero. After the prescribed time $T_1$ passed in keeping this state, the signal 12a releases the gate block and returns to the original DB signal of the "H" potential level with keeping the reactive current reference signal $I_Q^*$ zero control.

Then, after the prescribed time $T_2$ passed in keeping this state, the signal 12a releases the reactive current reference signal $I_Q^*$ zero control and returns to the ordinary operation state.

Now, the reason why the gate block (GB) is released before the release of the reactive current reference signal $I_Q^*$ zero control is that the switching devices of the single-phase inverter 4 require a certain time to shift from the GB state to the DB state. The reactive current feedback signal $I_{Q-}$ responds to the release of the reactive current reference signal $I_Q^*$ zero control immediately and rises (FIG. 5(d)) by employing the controlling sequence mentioned above.

Since the prior art SVG is composed as mentioned above, the reactive power generator executes the protection operation using the gate block immediately after the occurrence of the grounding accident. However, it has problems as follows, since it employs the system to resume its operation on the assumption that the time period from the occurrence of an accident to the recovery is the prescribed time $(T_1+T_2)$.

That is, when the period of the grounding accident duration is shorter than the time $(T_1+T_2)$, the resumption of the operation results in being retarded unnecessarily and the shake-stabilizing effect of the system by auto-returning becomes little.

Conversely, when the period of the grounding accident duration is longer than the time $(T_1+T_2)$, the resumption of the operation results in being resumed during the grounding accident. In this case, overcurrent is easy to flow as the system voltage is unsettled. Then it may be needed to execute the protecting operation again, and there is some possibility of repeating this operation stop and being not able to return to the normal operation if circumstances require.

SUMMARY OF THE INVENTION

An object of the present invention is to provide a SVG which can resume its operation immediately after the disappearance of an accident securely and smoothly and whose system is stabilized after the accident.

Another object of the present invention is to provide a static type reactive generator which can detect the occurrence and the disappearance of an accident securely.

Another object of the present invention is to provide a static type reactive generator whose structure is simple.

To attain objects described above, the static type reactive generator of a first aspect of the present invention has a protection controlling means which detects the occurrence of an accident in an alternating system and makes a reactive current reference inputted to a reactive current controller zero for a prescribed period of time from the occurrence point of time of the accident; the protection controlling means comprising an accident-detecting circuit detecting the accident in the alternating system; a reactive current reference zero controlling circuit, inserted between a system voltage controller and the reactive current controller, for controlling the reactive current reference to be zero according to the detection output of said accident-detecting circuit; and a soft starting circuit for restricting the returning speed of said reactive current reference within a prescribed value at the release of said reactive current reference zero control.

In the static type reactive generator of the first aspect of the present invention, the accident-detecting circuit detects the accident in the alternating system; the reactive current reference zero controlling circuit controls the reactive current reference to be zero according to the detection output of said accident-detecting circuit; and the soft starting circuit restricts the returning speed of said reactive current reference within the prescribed value at the release of said reactive current reference zero control. Hereby, the static type reactive generator of the first aspect detects the occurrence of an accident in the alternating system immediately and stops the output of the reactive current reference. Further, when the accident disappears, it returns the reactive current reference output after the prescribed period of time. Consequently, the operation after the disappearance of the accident can be resumed securely and smoothly, and the system can be stabilized after the accident.

In the SVG of a second aspect of the present invention, the accident-detecting circuit described above comprises a first and a second filter for detecting an active voltage inverse phase component and a reactive voltage inverse phase component respectively by extracting the second harmonic component of a system voltage frequency contained in a system active voltage and a system reactive voltage, a first and a second comparator comparing the outputs of these filters and a prescribed set value and outputting a signal when the formers exceed the latter, and an OR circuit operating logical sums of the output signals of these both comparators.

In the SVG of the second aspect of the present invention, the first and the second filter extracts the second harmonic component of the system voltage frequency and detects the active voltage inverse phase component and the reactive voltage inverse phase component respectively; the first and the second comparator compares these inverse phase components and the prescribed set value; and the OR circuit outputs a logical level "1" signal when either or both of the inverse phase components exceed the set value. Hereby, the SVG of the second aspect can securely detect the occurrence and disappearance of the accident with a simple structure. Further, the operation after the disappearance of the accident can be resumed securely and smoothly, and the system can be stabilized after the accident.

In the SVG of a third aspect of the present invention, the accident-detecting circuit described above comprises a third and a fourth filter for detecting an active voltage inverse phase component and a reactive voltage inverse phase component respectively by extracting a d.c. component contained in a system active voltage and a system reactive voltage obtained by transforming after inverting the phase order of each phase system voltage detected by a voltage-detecting means, an operating means for operating square roots of square sums of the outputs of these filters, and a third comparator comparing the outputs of the operating means and a prescribed set value and further outputting a signal when the formers exceed the latter.

In the SVG of a third aspect of the present invention, the third and the fourth filter extracts the d.c. component contained in the system active voltage and the system reactive voltage and detects the active voltage inverse phase component and the reactive voltage inverse phase component respectively; the operating means deduces the square roots of square sums of these inverse phase components; and the third comparator compares these square roots of square sums and the prescribed set value and outputs the signal when the formers exceed the latter. Hereby, the SVG of the third aspect can securely detect the occurrence and disappearance of the accident. Further, the operation after the disappearance of the accident can be resumed securely and smoothly, and the system can be stabilized after the accident.

In the SVG of a fourth aspect of the present invention, the accident-detecting circuit described above comprises a system voltage inverse phase component making circuit for making inverse phase components from detected each phase system voltage, and a fourth comparator for comparing the outputs of the system voltage inverse phase component making circuit and a prescribed set value and outputting a signal when the formers exceed the latter.

In the SVG of the fourth aspect, the system voltage inverse phase component making circuit makes the inverse phase components from each phase system voltage, and the fourth comparator compares the inverse phase components and the prescribed set value and outputs the signal when the formers exceed the latter. Hereby, the SVG of the fourth aspect can securely detect the occurrence and disappearance of the accident. Further, the operation after the disappearance of the accident can be resumed securely and smoothly, and the system can be stabilized after the accident.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the present invention.

BRIEF DESCRIPTION OF THE DRAWINGS

FIG. 3(a)–FIG. 3(e) are is a timing chart showing the operation when the inverter apparatus of FIG. 2 outputs a lagging current.

FIG. 4(a)–FIG. 4(e) are is a timing chart showing the operation when the inverter apparatus of FIG. 2 outputs an advanced phase current.

DETAILED DESCRIPTION OF THE PREFERRED EMBODIMENTS

EMBODIMENT 1

Figure 6:
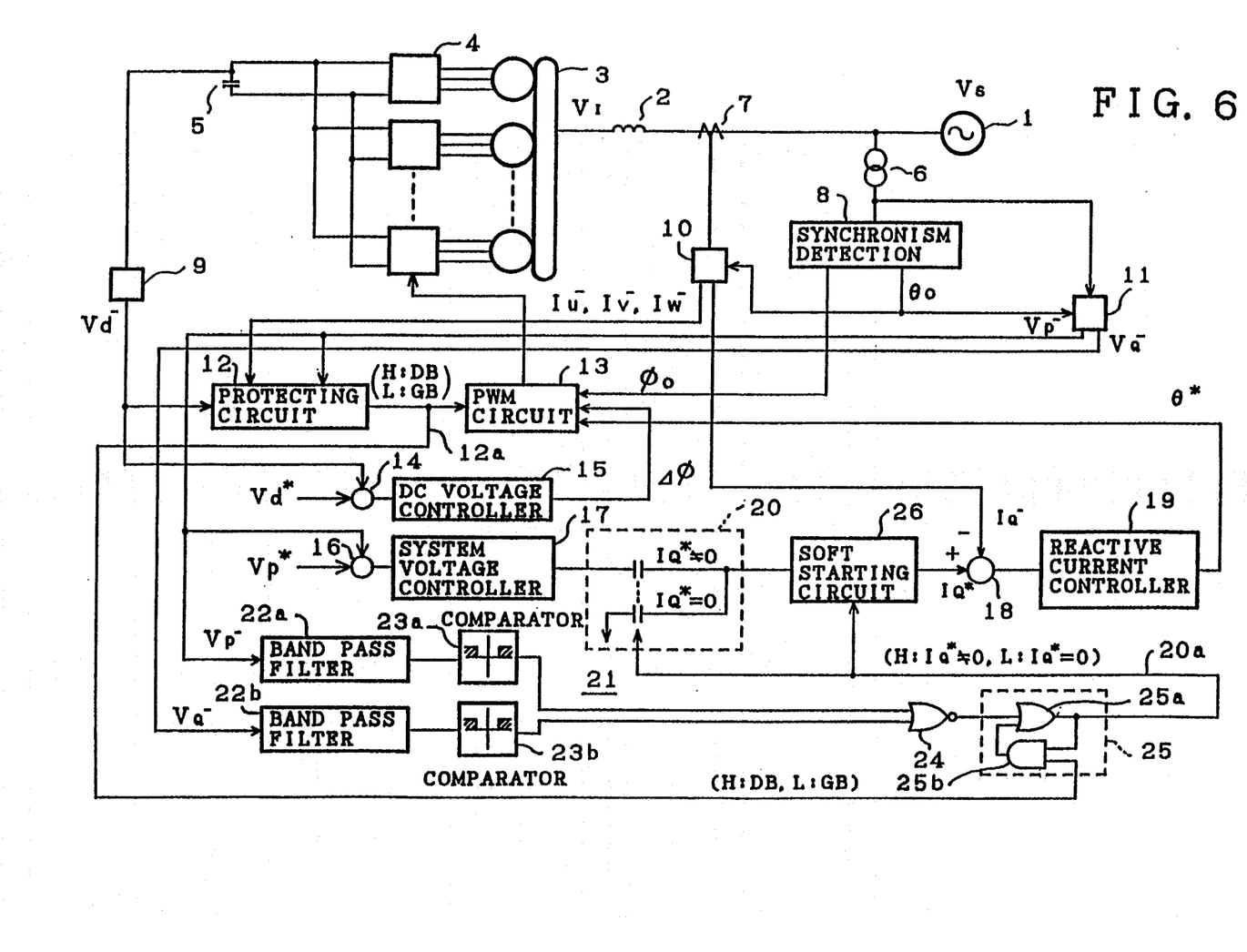
FIG. 6 is a circuit diagram showing the SVG of the embodiment 1 of the present invention.

FIG. 6 is a circuit diagram showing the SVG of the embodiment 1 of the present invention. In FIG. 6, parts identical to those of the prior art SVG are designated by the same reference numerals, and the duplicate description will be omitted. At first, the description about an accident-detecting circuit 21 drawn at the lower part of the drawing will be done.

Reference numeral 22a designates a band pass filter as the first filter extracting the second harmonic 2f (f designates a system voltage fundamental frequency) component of the active voltage feedback signal Vp− from the voltage detector 11 for detecting an inverse component produced by the occurrence of the grounding accident in the alternating system 1. Reference numeral 23a designates the first comparator comparing the second harmonic component and a prescribed value and outputting a "H" potential level signal when the former exceeds the latter.

Reference numeral 22b and 23b similarly designate a band pass filter as the second filter extracting the second harmonic component of the reactive voltage feedback signal $V_Q^-$ from the voltage detector 11 and the second comparator for judging the voltage level of the output signal from the band pass filter 22b respectively.

Reference numeral 24 designates an OR circuit operating a logical sum of the output signals from the comparators 23a and 23b. Reference numeral 25 designates a holding circuit holding the signal from the OR circuit 24 for a prescribed period of time in connection with the GB/DB signal 12a, too, from the protecting circuit 12, and the holding circuit 25 is composed of an OR gate 25a and an AND gate 25b. Reference numeral 26 designates a soft starting circuit restricting the returning speed (rising speed) within a prescribed value immediately after the release of the reactive current reference signal $I_Q^*$ zero control.

Next, the appearance of the second harmonic vibrating components in the active voltage $V_P$ and the reactive voltage $V_Q$ in case of the occurrence of the grounding accident in the alternating current system 1 will be described.

At first, the active voltage Vp and the reactive voltage $V_Q$ are deduced by executing of the what is called d-q transformation of system voltages Va, Vb and Vc with the following expression.

$$\begin{pmatrix} V_Q \\ V_P \end{pmatrix} = \begin{pmatrix} d \\ q \end{pmatrix} = \quad (1)$$

$$K_0 \begin{pmatrix} \cos\theta & \cos(\theta - 2\pi/3) & \cos(\theta + 2\pi/3) \\ \sin\theta & \sin(\theta - 2\pi/3) & \sin(\theta + 2\pi/3) \end{pmatrix} \begin{pmatrix} V_a \\ V_b \\ V_c \end{pmatrix}$$

where $\theta = \omega t = 2\pi f t$ f: frequency of the alternating current system $K_O$: constant Next, the system voltages Va, Vb and Vc can be expressed like the following expression by expressing the virtual values of the positive phase components, the inverse phase components and the harmonic components of the system voltages as $V_1$, $V_2$ and $V_h$ respectively.

$$\begin{pmatrix} V_a \\ V_b \\ V_c \end{pmatrix} = \quad (2)$$

$$\sqrt{2} \begin{pmatrix} V_1\sin(\theta + \gamma_1) + V_2\sin(\theta + \gamma_2) + V_h \\ V_1\sin(\theta + \gamma_1 - 2\pi/3) + V_2\sin(\theta + \gamma_2 + 2\pi/3) + V_h \\ V_1\sin(\theta + \gamma_1 2\pi/3) + V_2\sin(\theta + \gamma_2 - 2\pi/3) + V_h \end{pmatrix}$$

where $\gamma_1, \gamma_2$: phase angle

The expression (3) is obtained by substituting the expression (2) into the expression (1).

where $K_1$: constant

From expression (3), it can be seen that the inverse components of system voltages generated by the grounding accident $$K_1 \begin{pmatrix} V_Q \\ V_P \end{pmatrix} = V_1 \begin{pmatrix} \sin\gamma_1 \\ \cos\gamma_1 \end{pmatrix} + V_2 \begin{pmatrix} \sin(2\theta + \gamma_2) \\ \cos(2\theta + \gamma_2) \end{pmatrix} + \quad (3)$$

$$V_h \begin{pmatrix} \begin{pmatrix} \text{harmonic} \\ \text{component} \end{pmatrix} \\ \begin{pmatrix} \text{harmonic} \\ \text{component} \end{pmatrix} \end{pmatrix}$$

in the alternating current system 1 are expressed as the vibration components of the second harmonics (2θ) after the transformation to the active and reactive voltages.

Next, the operation of the SVG, especially the operation at the time of the system accident, will be described on referring to FIG. 7(a)-FIG. 7(e), too. In FIG. 7(a)–FIG. 7(e), when a one-line or a two-line grounding accident occurs in the alternating current system 1, the protecting circuit 12 immediately detects the accident to change its GB/DB signal 12a to the GB signal of "L" potential level in the same manner as the prior art. Then, the protecting circuit 12 makes the gate of the single-phase inverter 4 stop. And, since the second harmonic components (components of frequency 2f) appear in the active voltage feedback signal Vp− and the reactive voltage feedback signal $V_Q^-$, the comparators 23a and 23b detect the second harmonic components through the band pass filters 22a and 22b.

By the way, since the output signal of the holding circuit 25 or the input signal 20a into the reactive current reference zero controlling circuit 20 is in "H" potential level and the output signal 12a of the protecting circuit 12 is in the DB potential level or "H" potential level, the AND gate 25b outputs "H" potential level signal and the holding circuit 25 is holding the "H"

potential level output signal. The output signal of the OR circuit 24 also is in "H" potential level.

Now, when at least one of the output signals of the comparators 23a and 23b becomes in "H" potential level by the occurrence of an accident, the output signal from the OR circuit 24 becomes in "L" potential level and the signal 12a also becomes in GB potential level or "L" potential level. Hereby, the output signal 20a of the holding circuit 25 becomes in "L" potential level, then the reactive current reference zero controlling circuit 20 controls the reactive current reference signal $I_Q^*$ to be zero.

This state continues for the minimum time $T_1$ (refer FIG. 7(c) and FIG. 7(e)) required to stop the system current by the GB (gate block).

Then, after the time $T_1$ passed, the signal 12a returns to the DB potential level or "H" potential level. However, the output potential level of the AND gate 25b does not change, and the input signal 20a maintains the "L" potential level. Accordingly, the reactive current reference zero controlling circuit 20 results in keeping the $I_Q^*$ zero controlling. But, since the GB (gate block) has been released, the single-phase inverter 4 has become being ready to be able to rise the output of the reactive current $I_Q$ at any time.

Now, if the grounding accident in the alternating system 1 disappears and the alternating system 1 recovers, the outputs of the comparators 23a and 23b return to the "L" potential level, as the second harmonic components of the active voltage feedback signal $V_P-$ and the reactive voltage feedback signal $V_Q-$ disappear. Then, the output from the OR circuit 24 becomes the "H" potential level, and the output signal 20a of the holding circuit 25 becomes the "H" potential level. Accordingly, the reactive current reference zero controlling circuit 20 immediately releases its $I_Q^*$ zero controlling. By this release, the soft starting circuit 26 is actuated to rise the reactive current signal $I_Q^*$ in a predetermined slope, and the soft starting circuit 26 returns the reactive current signal $I_Q^*$ to the original potential level smoothly after the time T passed (see FIG. 7(d)). Further, the holding circuit 25 holds the output state mentioned above till the occurrence of the next accident.

As described above, this embodiment 1 can securely and smoothly resume the operation of the SVG immediately after the disappearance of an accident, and it can securely contribute to the stabilization of the system after the accident. Though it requires the time $T_1$ to the GB (gate block) for stopping the system current grown to be excessive by the occurrence of the accident, the time $T_1$ is not a hindrance as the time $T_1$ can be set to be short enough to the duration time of the accident.

Further, though the embodiment 1 of FIG. 6 is composed to detect the second harmonic components of both the active voltage feedback signal $V_P-$ and the reactive voltage feedback signal $V_Q-$ and to take out their output signals through the OR circuit 24, it may be acceptable to compose it to detect the second harmonic components from either feedback signal.

Also, though the embodiment 1 of FIG. 6 is composed to detect the occurrence point of time of an accident with the protecting circuit 12 similarly to the prior art SVG, it also may acceptable to compose it to detect the occurrence point of time of an accident with the accident-detecting circuit 21.

EMBODIMENT 2

Figure 8:
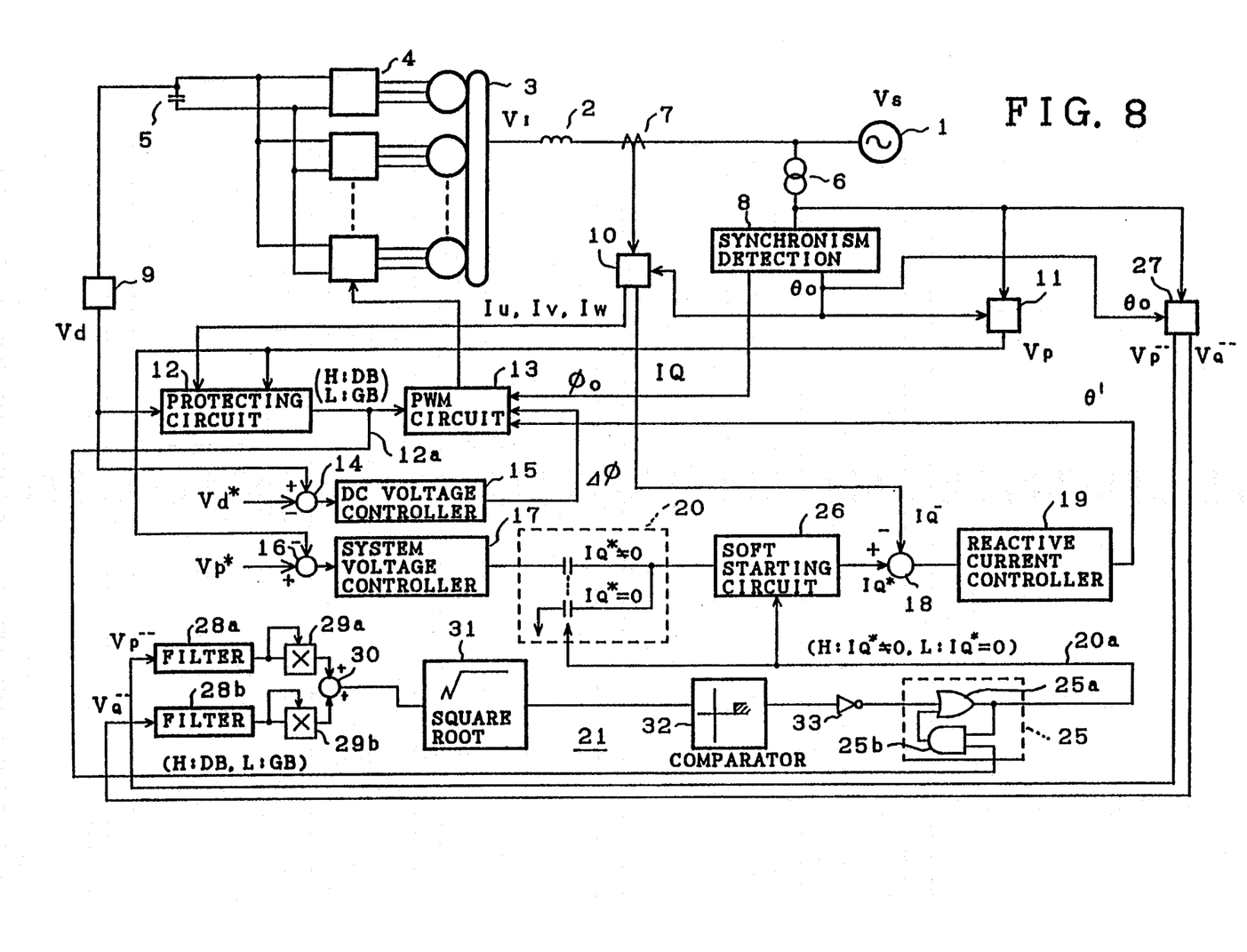
FIG. 8 is a circuit diagram showing the SVG of the embodiment 2 of the present invention.

FIG. 8 is a circuit diagram showing the SVG of the embodiment 2 of the present invention. Because the embodiment 2 differs from the embodiment 1 shown in FIG. 6 in the accident-detecting circuit 21, the accident-detecting circuit 21 will be described mainly hereinafter.

In FIG. 8, reference numeral 27 designates a voltage detector as a voltage-detecting means outputting an active voltage feedback signal $V_P--$ and a reactive voltage feedback signal $V_Q-$ deduced by executing the d-q transformation from each phase system voltage signal, the phase order inverted signals of the signals detected by the PT 6, and the phase angle $\theta_O$.

Reference numeral 28a designates a low pass filter as a third filter extracting the d.c. component of the active voltage feedback signal $V_P--$ from the voltage detector 27 for detecting inverse components generated by the occurrence of a grounding accident in the alternating current system 1. Reference numeral 29a designates a multiplier squaring the output of the low pass filter 28a. Reference numerals 28b and 29b similarly designate a low pas filter as a fourth filter extracting the d.c. component of the reactive voltage feedback signal $V_Q--$ from the voltage detector 27 and a multiplier squaring the output of the low pass filter 28b respectively.

Reference numeral 30 designates an adder. Reference numeral 31 designates a square roots operator. The multipliers 29a and 29b, the adder 30 and the square roots operator 31 compose an operating means. Reference numeral 32 designates a third comparator comparing outputs from the square roots operator 31 and a prescribed value and outputting "H"potential level signals when the former exceeds the latter. Reference numeral 33 designates an inverter inverting signal potential levels.

Next, it will be described that the inverse phase components of the active voltage feedback signal $V_P--$ and the reactive voltage feedback signal $V_Q--$ appear in the both feedback signals as d.c. components.

The following expression (4) expresses the system voltages transformed by the d-q transformation after inverting the phase order of them.

$$\begin{pmatrix} V_Q \\ V_P \end{pmatrix} = \begin{pmatrix} d \\ q \end{pmatrix} K_0 \begin{pmatrix} \cos\theta & \cos(\theta - 2\pi/3) & \cos(\theta + 2\pi/3) \\ \sin\theta & \sin(\theta - 2\pi/3) & \sin(\theta + 2\pi/3) \end{pmatrix} \begin{pmatrix} V_a \\ V_c \\ V_b \end{pmatrix} \quad (4)$$

where $\theta = \omega t = 2\pi f t$
f = frequency of the alternating current system
$K_O$ = constant The expression (5) is obtained by substituting the expression (2) described above to the expression (4).

$$K_1 \begin{pmatrix} V_Q \\ V_P \end{pmatrix} = V_2 \begin{pmatrix} \sin\gamma_2 \\ \cos_2 \end{pmatrix} + V_1 \begin{pmatrix} \sin(2\theta + \gamma_1) \\ \cos(2\theta + \gamma_1) \end{pmatrix} + \quad (5)$$

$$V_h \begin{pmatrix} \begin{pmatrix} \text{harmonic} \\ \text{component} \end{pmatrix} \\ \begin{pmatrix} \text{harmonic} \\ \text{component} \end{pmatrix} \end{pmatrix}$$

where $K_1$: constant

It can be seen from the expression (5) that the inverse components of system voltages generated by the grounding accident in the alternating current system 1 are expressed as the d.c. components after the transformation to the active and reactive voltages.

The embodiment 2 shown in FIG. 8 embodies the system described above, and in which the d.c. components of the active voltage feedback signal $Vp^{--}$ and the reactive voltage feedback signal $V_Q-$ obtained by inverting the phase order of the system voltages and by transforming them by the voltage detector 27 are extracted by the low pass filters 28a and 28b, and further in which square roots of square sums of both outputs are operated by the multipliers 29a and 29b, the adder 30 and square root operator 31, then in which the comparator 32 judges the occurrence of an accident.

Figure 7:
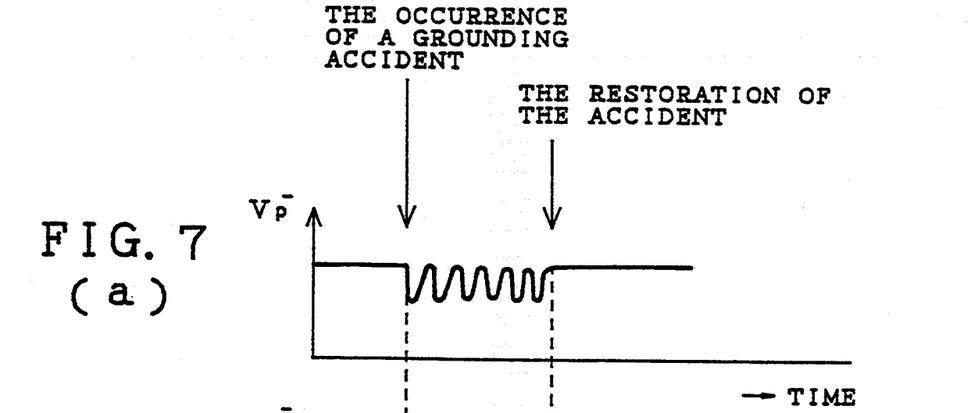
FIG. 7(a)-FIG. 7(e) are timing charts showing the protection operation of the static type power generator of FIG. 6.

Since the other operation is identical to the embodiment of FIG. 6 and FIG. 7, the description about it is omitted. Now, this embodiment 2, too, can securely and smoothly resume the operation of the SVG immediately after the disappearance of a system accident, and it can securely contribute to the stabilization of the system after the accident.

EMBODIMENT 3

Figure 9:
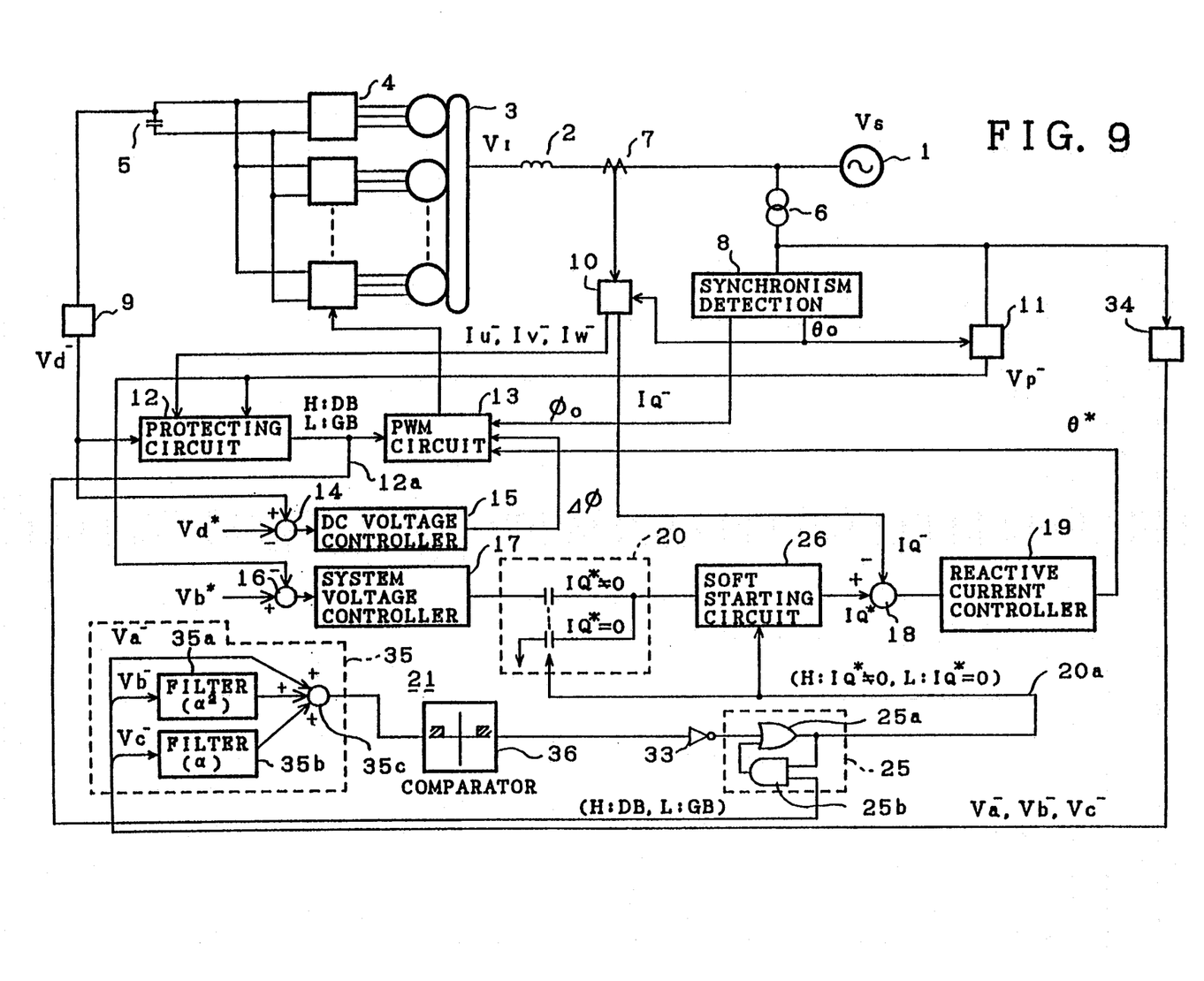
FIG. 9 is a circuit diagram showing the SVG of the embodiment 3 of the present invention.

FIG. 9 is a circuit diagram showing the SVG of the embodiment 3 of the present invention. Because the embodiment 3 also differs from the embodiments mentioned above in the accident-detecting circuit 21, the accident-detecting circuit 21 will be described mainly hereinafter.

In FIG. 9, reference numeral 34 designates a voltage detector as a voltage-detecting means outputting three-phase component system voltage feedback signals $Va^-$, $Vb^-$ and $Vc^-$ based on the detected output by the PT 6. Reference numeral 35 designates a system voltage inverse phase component making circuit, which is composed of a filter 35a constituted of first order time lag elements delaying the phase of the voltage signal $Vc-$ by $2\pi/3$ and an adder 35c operating the sum of each phase voltage signal. Reference numeral 36 designates a fourth comparator comparing the outputs from the system voltage inverse phase component making circuit 35 and a prescribed value and outputting "H" potential level signal when the formers exceed the latter.

The expression (6) shows the relation between the three-phase a.c. voltages Va, Vb and Vc and a zero phase component V0, positive phase component $V_1$ and an inverse phase component $V_2$.

$$\begin{pmatrix} V_0 \\ V_1 \\ V_2 \end{pmatrix} = K_2 \begin{pmatrix} 1 & 1 & 1 \\ 1 & \alpha & \alpha^2 \\ 1 & \alpha^2 & \alpha^2 \end{pmatrix} \begin{pmatrix} V_a \\ V_b \\ V_c \end{pmatrix} \quad (6)$$

where $K_2$: constant
$\alpha$: $e^{j2\pi/3}$

From the expression (6), the inverse phase component $V_2$ generated by a system accident is obtained as the sum of phase delayed each phase voltage as shown in the expression (7).

$$V_2 = K_2(Va + e^{j2\pi/3} \times Vb + e^{j2\pi/3} \times Vc) \quad (7)$$

In FIG. 9, the inverse components of the system voltage feedback signals $Va-$, $Vb-$ and $Vc-$ are made by the system voltage inverse component making circuit 35, then the comparator 36 judges them. Accordingly, this embodiment 3, too, can securely and smoothly resume the operation of the SVG immediately after the disappearance of a power system accident, and it can securely contribute to the stabilization of the system after the accident.

EMBODIMENT 4

Further, though each embodiment mentioned above executes DB (de-block) after the prescribed time $T_1$ passed after executing GB (gate block) by detecting a system accident, it is needless to take the same sequence in the application of the present invention. Then the sequence where the GB is released at the same time as the disappearance of the accident is also applicable.

The SVG of the first aspect of the present invention composes its protection controlling means, making the reactive current reference zero, of the accident-detecting circuit, the reactive current reference zero controlling circuit and the soft starting circuit, therefore the static type reactive generator of the first aspect detects the occurrence of an accident in the alternating system immediately and stops the output of the reactive current reference. Further, after the accident disappears, the operation of the SVG can be resumed securely and smoothly after the prescribed period of time, and the power system can be stabilized after the accident.

The SVG of the second aspect of the present invention composes its accident-detecting circuit of the first and the second filter, the first and the second comparator, and the OR circuit. Therefore, the SVG of the second aspect can securely detect the occurrence and disappearance of an accident with a simple structure. Further, the operation after the disappearance of the accident can be resumed securely and smoothly, and the system can be stabilized after the accident.

The SVG of the third aspect of the present invention comprises the third and the fourth filter, the operating means and the third comparator, therefore it can securely detect the occurrence and disappearance of an accident. Further, the operation after the disappearance of the accident can be resumed securely and Smoothly, and the power system can be stabilized after the accident.

The SVG of the fourth aspect of the present invention comprises the system voltage inverse phase component making circuit and the fourth comparator, therefore it can securely detect the occurrence and disappearance of an accident. Further, the operation after the disappearance of the accident can be resumed securely and smoothly, and the power system can be stabilized after the accident.

While preferred embodiments of the present invention have been described using specific terms, such description is for illustrative purpose only, and it is to be understood that changes and variations may be made without departing from the spirit or scope of the following claims.

What is claimed is:

1. In a static var generator using self-commutated inverter having an inverter apparatus converting a d.c. power source voltage to an a.c. voltage and supplying the a.c. voltage to an alternating current system through a reactor, a voltage-detecting means detecting each phase voltage of said alternating current system and converting them to active voltages and reactive voltages, a current-detecting means detecting each phase current of said reactor and operating a reactive current, a system voltage controller operating a reactive current reference from said system active voltages and a system voltage reference, a reactive current controller operating conduction signals of switching devices of said inverter apparatus from said reactive current and said reactive current reference from said system voltage controller, and a protection controlling means detecting an occurrence of an accident in said alternating current system and making said reactive current reference to be inputted to said reactive current controller zero for a prescribed period of time from the occurrence point of time of the accident;

said protection controlling means comprising:

an accident-detecting circuit detecting the accident from the occurrence to the disappearance of it in said alternating system, a reactive current reference zero controlling circuit controlling said reactive current reference to be zero according to detected outputs of said accident-detecting circuit, said reactive current reference zero controlling circuit inserted between said system voltage controller and said reactive current controller, and a soft starting circuit restricting returning speeds of said reactive current reference within a prescribed value at the time of the release of said reactive current reference zero control.

2. A static var generator using self-commutated inverter according to claim 1, wherein said accident-detecting circuit comprises:

a first and a second filter for detecting active voltage inverse phase components and reactive voltage inverse phase components respectively by extracting second harmonic components contained in said system active voltages and said system reactive voltages, said harmonic components having system voltage frequencies, a first and a second comparator comparing outputs of these filters and a prescribed set value and outputting a signal when the formers exceed the latter, and an OR circuit operating logical sums of the output signals of these both comparators.

3. A static var generator using self-commutated inverter according to claim 1, wherein said accident-detecting circuit comprises:

a third and a fourth filter for detecting active voltage inverse phase components and reactive voltage inverse phase components respectively by extracting d.c. components contained in said system active voltages and said system reactive voltages obtained by transforming after inverting the phase order of each phase system voltage detected by said voltage-detecting means, an operating means operating square roots of square sums of the outputs of these each filter, and a third comparator comparing the outputs of the operating means and a prescribed set value and outputting a signal when the formers exceed the latter.

4. A static var generator using self-commutated inverter according to claim 1, wherein said accident-detecting circuit comprises:

a system voltage inverse phase component making circuit detecting each phase system voltage and making inverse phase components from them, and a fourth comparator for comparing the outputs of the system voltage inverse phase component making circuit and a prescribed set value and outputting a signal when the formers exceed the latter.

* * * * *